United States Patent [19]

Carruthers, II

[11] Patent Number: 5,331,306

[45] Date of Patent: Jul. 19, 1994

[54] SECURITY TOOL ABSENCE ALARM SYSTEM

[76] Inventor: John W. Carruthers, II, 1316 Rock Circle Dr., Columbia, Pa. 17512

[21] Appl. No.: 176,686

[22] Filed: Jan. 3, 1994

Related U.S. Application Data

[63] Continuation of Ser. No. 51,852, Apr. 26, 1993, abandoned.

[51] Int. Cl.$^5$ .............................................. B60Q 1/00
[52] U.S. Cl. .................................. 340/425.5; 340/568
[58] Field of Search ...................... 340/425.5, 438, 457, 340/457.1, 568, 572; 200/61.58 B

[56] References Cited

U.S. PATENT DOCUMENTS

| | | | |
|---|---|---|---|
| 3,770,919 | 11/1973 | Lewis | 200/61.58 B |
| 4,531,116 | 7/1985 | Takagi | 340/457 |
| 4,661,806 | 4/1987 | Peters et al. | 340/568 |
| 4,849,733 | 7/1989 | Conigliaro | 340/457.1 |
| 5,051,724 | 9/1991 | Morrow et al. | 340/568 |
| 5,162,793 | 11/1992 | Plost | 340/568 X |

Primary Examiner—Hezron E. Williams
Assistant Examiner—Christine K. Oda
Attorney, Agent, or Firm—Charles J. Long

[57] ABSTRACT

An alarm system for use with vehicles having a part requiring a special security tool for attachment or removal includes a bracket for removably holding the tool in a storage position, a normally closed electric proximity switch which opens when the tool is in the storage position, and an electric alarm. The proximity switch and alarm are wired in a circuit which is energized only when the vehicle ignition switch is on. When the tool is away from its storage position, the proximity switch is closed, and the alarm alerts the driver of such fact when the vehicle ignition is turned on. A preferred system includes a permanent disc magnet mounted on the security tool, a magnetically actuated reed proximity switch, and a magnetic buzzer alarm, the permanent magnet and switch being mounted on the tool and bracket respectively in such locations that the magnet is within the actuation distance of the switch when the tool is in its storage position.

6 Claims, 1 Drawing Sheet

SECURITY TOOL ABSENCE ALARM SYSTEM

This application is a continuation of application Ser. No. 08/051,852, filed Apr. 26, 1993, now abandoned.

BACKGROUND OF THE INVENTION

1. Field of the Invention

This invention relates to a security tool absence alarm system. More particularly, the invention relates to a system for use with automobiles and other vehicles equipped with parts requiring specially designed tools for attachment and removal, which activates an alarm whenever the ignition is on and the specially designed tool is missing from a predetermined storage position in the vehicle. In this specification and the claims following, any such specially designed tool required for attachment or removal of such parts will be termed a "security tool".

2. Description of the Prior Art

Many modern automobiles, trucks and other vehicles are equipped with costly parts, for example wheels or wheel covers. In order to prevent or at least discourage theft, such parts are generally attached to the vehicle by means of one or more bolts or similar fastening devices which can be engaged or disengaged only with a security tool. For example, a wheel lug nut may have a unique shape which cannot be engaged by a standard lug wrench, and the vehicle is provided with a security tool which is a lug wrench or socket member especially shaped to engage lug nuts having the unique shape.

A serious problem can arise with vehicles having the above-described features if the owner, garage mechanic, etc. removes the security tool, for example use in rotating the tires, and forgets to put it back in the vehicle, e.g. in the glove compartment or trunk. If in such case the owner or driver should experience a flat tire while on the road, he or she would be unable to remove the wheel or wheel cover at all, or at least without causing serious damage to the part. The difficulties and potential dangers of such a situation are obvious, especially given the frequency of muggings, car thefts, etc. in current society.

Great inconvenience and potential damage could be avoided if the operator of a vehicle such as described above could be alerted to the absence of the security tool whenever the vehicle ignition was turned on. So far as I am aware, nothing in the prior art deals with this problem, the closest such art relating only to storage and control of keys for locks.

In the key and lock field, the prior art discloses several arrangements for key management, e.g. for limiting key access to particular persons or for producing a signal if a key has been out of a storage housing for a particular period of time. For example, Peters et al. U.S. Pat. No. 4,661,806 discloses a highly complex computer-controlled system for managing and controlling access to several keys in larger businesses such as hotels and car dealerships; FIG. 9 of the patent and the specification related thereto teach use of an alarm if the status of a key has changed or a key has been issued to a person without proper access authorization. Morrow et al. U.S. Pat. No. 5,051,724 discloses a key security device for use in prisons, mental hospitals etc., and teaches the use of a mechanical switch operator which responds to insertion and removal of a key from a housing and is set to sound an alarm if the key is out of the housing for more than a predetermined interval of time. However, neither reference relates in any way to security tools for vehicle parts such as wheels and wheel covers, and neither of the systems taught by the references would be practical or economically feasible for use in an automobile, truck or the like.

SUMMARY OF THE INVENTION

I have developed a security tool absence alarm system which is simple in construction, convenient to use in automotive vehicles, and significantly minimizes the likelihood that a vehicle will be driven without its security tool on board.

In accordance with the invention, I provide, for use with an automobile vehicle having an engine, an electric ignition switch which must be closed to operate the engine, a part which can only be removed with a security tool, and a security tool especially designed for removing the part, a security tool absence alarm system comprising a bracket member adapted to removably hold the security tool in a predetermined storage position and electric alarm means which create an alarm signal when the ignition switch is closed and the security tool is not in the storage position in the bracket.

In a preferred embodiment, the electric alarm means comprise a permanent magnet of predetermined strength having a shape and size permitting it to be mounted on the security tool; means mounting the permanent magnet on the security tool; an electrically activated alarm member; normally closed magnetically responsive electric switch means which open when the permanent magnet is within a predetermined response distance from the switch means; means securing the electric switch means to the bracket at a location such that when the security tool is in the storage position on the bracket the permanent magnet is within the response distance from the electric switch means, whereby the electric switch means are opened; and electrical connection means for forming an alarm circuit which includes the electric switch means, the electrically activated alarm member and the ignition switch in such electrical arrangement that the alarm circuit is energized only when the ignition switch is closed.

Preferably the electric switch means comprise a magnetically actuated reed switch.

In an embodiment for use with a security tool comprising an elongated member having a first end the permanent magnet is mounted on said first end.

Other details, objects and advantages of the invention will become apparent as the following description of a certain present preferred embodiment thereof proceeds.

BRIEF DESCRIPTION OF THE DRAWINGS

In the accompanying drawings I have shown a certain present preferred embodiment of the invention in which.

DESCRIPTION OF THE PREFERRED EMBODIMENT

Figure 1:
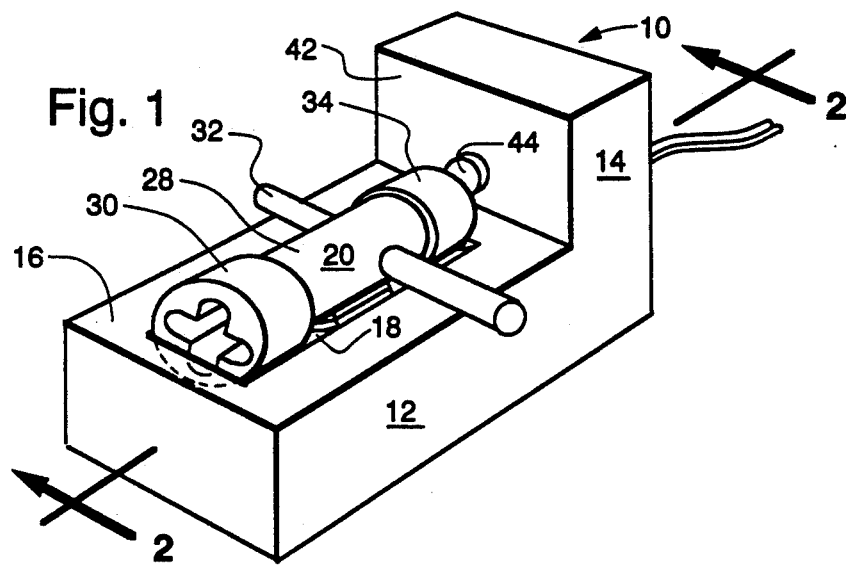
FIG. 1 is a perspective view of components of an alarm system according to the invention, including a security tool in its storage position on a bracket which is suitable for mounting in a vehicle.
Figure 2:
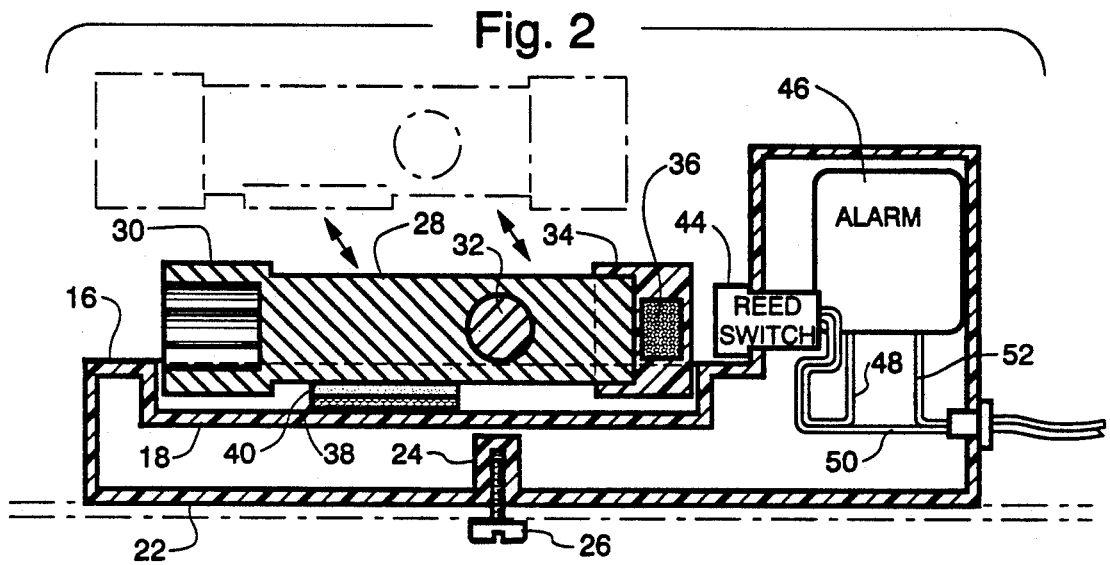
FIG. 2 is a sectional view taken on the line 2—2 of FIG. 1 and showing the interior construction of the components of FIG. 1.

Referring to FIGS. 1 and 2, there is shown a hollow bracket member 10 having a base section 12 and an end section 14 at right angles to the base section. The top wall 16 of the base section is shaped to form a trough-like depression 18 adapted to hold a security tool 20 in the storage position shown. The bottom wall 22 of the base section is shaped to form a hole 24 for receiving a screw 26 whereby the bracket member can be attached to a suitable location in a vehicle, typically the floor of the glove compartment, shown in broken lines in FIG. 2; such attachment can also be by other fastening means such as clips, adhesives, etc.

In the embodiment shown, the security tool 20 is a lug wrench comprising an elongated generally cylindrical body portion 28 having a specially shaped socket 30 at one end. Near the other end of the tool a cylindrical cross bar 32 is inserted in a transverse hole formed in the tool body; cross bar 32 serves as means for exerting torque on the socket when loosening or tightening a wheel lug nut, not shown, having a shape which socket 30 fits. A friction fitting cap 34 of flexible plastic or the like is attached to the end of tool 20 opposite socket 30 and serves to mount a disc-shaped permanent magnet 36, which forms a part of the electric alarm means and is discussed further hereinbelow, on the tool end; it will be appreciated that as so mounted, the magnet portion of the electric alarm means is continuously connected to the security tool.

Figure 3:
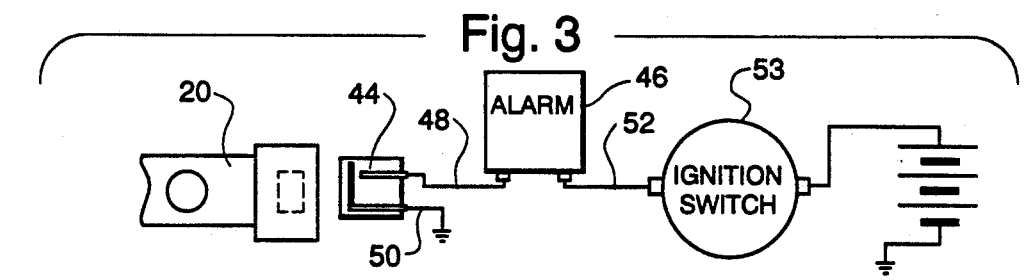
FIG. 3 shows a simplified electrical circuit of the system with the security tool in its storage position.
Figure 4:
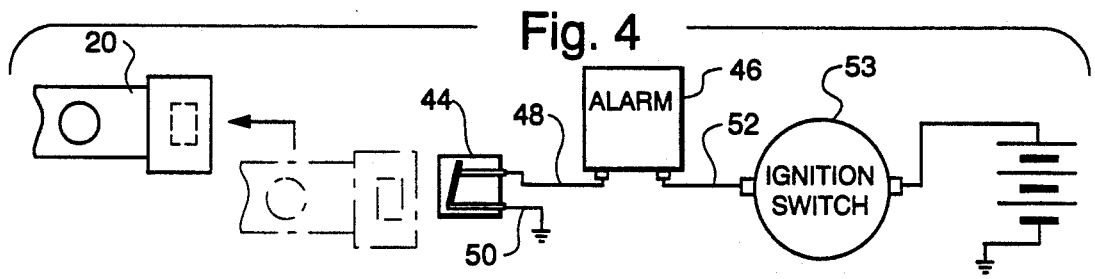
FIG. 4 shows the circuit of FIG. 3 but with the security tool removed from its storage position.

A first piece of hook and loop fastening material 38, such as VELCRO ®, is attached, for example by gluing, to the bottom of trough 18 and a mating piece of the material 40 is similarly attached to the body 28 of tool 20. The pieces of fastening material are so positioned as to ensure that whenever tool 20 is placed in its storage position in trough 18 magnet 36 will always be in the same location with respect to a magnetically-responsive switch 44 positioned in the upstanding wall 42 of the bracket, for reasons to be discussed. I prefer hook and loop fastening material as a convenient and readily available means of removably holding security tool 20 in its predetermined storage position; however, other fastening means could be used, the main criterion being that the tool can be easily removed from its storage position in the bracket and later replaced in the same location and orientation. The electric alarm means of the herein described embodiment of the invention are illustrated in FIGS. 2 through 4 and will now be discussed. Referring to those Figures, a normally closed magnetically responsive electric switch, in this case a normally closed magnetically actuated reed proximity switch 44 having a predetermined actuation distance relative to magnet 36, is mounted in an opening formed in the upstanding wall 42 of bracket member 10; the switch is positioned such that when the tool 20 is in its storage position magnet 36 is within the actuation distance of the switch. Also mounted in the interior of the end section 14 of bracket 10 is an electrically activated alarm member 46 which produces an audible alarm when energized. In the embodiment shown both switch 36 and alarm member 46 operate on 12 volt direct current, as used in virtually all current motor vehicles. Electrical leads 48 and 50 are connected to the terminals of switch 44; lead 48 connects one terminal of the switch to one terminal of alarm member 46, and another lead 52 is connected to the other terminal of alarm member 46. Leads 50 and 52 then exit the rear of bracket member 10 and one, 52 in FIGS. 3 and 4, is connected to the positive terminal of a part of the vehicle circuit which is energized only when the vehicle ignition switch 53 is closed; the other lead, 50 in FIGS. 3 and 4, is grounded by connecting it to, e.g. the frame or sheet metal of the vehicle body. I have found it convenient to connect one of leads 50 and 52 to the clip holding an appropriate fuse in the vehicle's circuitry, often that protecting the radio circuit, but the lead could with equal effectiveness be connected to a terminal of the ignition switch itself.

FIGS. 3 and 4 show in simplified electrical schematics how the alarm system of FIGS. 1 and 2 functions. In FIG. 3 the security tool 20 is in its storage position, with magnet 36 actuating switch 44 and causing the switch to be open. In FIG. 4, tool 20 has been removed from the storage position, which moves magnet 36 out of actuation range from switch 44 and allows switch 44 to return to its normally closed condition. If the ignition switch 53 is closed, thereby energizing the circuit of FIGS. 3 and 4, alarm member 46 is silent as long as tool 20 is in the storage position of FIG. 3, i.e. with magnet 36 keeping switch 44 open, but when the tool 20 is away from its storage position, as in FIG. 4, switch 44 will be closed and alarm member 46 will sound, thereby alerting the vehicle driver that the security tool is not in place.

A combination of switch 44 and magnet 36 which I have found useful in the practice of the invention comprises a GRI 3030-12WG wide gap press fit magnetic contact reed switch and a ½" diameter by 3/16" thick ceramic 5 disc magnet, both available from G.R.I. Telemark Corporation of Kimball, Nebr. The disc magnet size is compatible with many of the security tools in current use, and the combination has a convenient actuation distance of 1", i.e. if the magnet is 1" or less from the switch the switch will open. Other magnet/switch combinations could of course be used, as could different arrangements for creating an alarm signal when the security tool is away from its storage position, as will be apparent to those skilled in the art. For example, it may be useful in some cases to use a switch which employs ultrasound or light to detect the presence or absence of the security tool.

With respect to the electrically activated alarm member, I have found it convenient to use a magnetic buzzer, which produces an easily heard relatively nonirritating sound. One suitable buzzer is a 3.4 kHz, 85 dB(A), 12 volt DC unit, Archer catalog No. 273026, available at Radio Shack stores. Different types of audible alarm members, as well as visual alarm members such as a dash board warning light, could also be used as desired in the practice of the invention.

The size and shape of the bracket member can vary widely, as will be appreciated, depending on the size and shape of the security tool in question, the location in the vehicle where the bracket will be mounted, etc. I have found that a bracket shape generally as shown in FIG. 1 and having overall dimensions of about 5" length, 2" width and 2" height, can accommodate most security tools in current use. The bracket may desirably be fabricated from a rigid plastic, although the specific material used is a matter of choice by the person practicing the invention.

While I have shown and described a certain present preferred embodiment of the invention, it is to be distinctly understood that the invention is not limited thereto, but may be otherwise variously embodied within the scope of the following claims.

I claim:

1. In combination with an automotive vehicle having an engine and an electric ignition switch which must be closed to operate the engine:
   a. a part removably attached to the vehicle;
   b. a security tool configured specifically for use in removing the part, said security tool being mountable on the vehicle for storage and completely detachable from the vehicle for use;
   c. a bracket member mounted on the vehicle and constructed to removably hold said security tool in a predetermined storage position on the vehicle; and
   d. electric alarm means which produces an alarm signal when the ignition switch is closed and said security tool is not in said storage position in said bracket member.

2. The combination claimed in claim 1 in which a portion of the electric alarm means is continuously connected to the security tool.

3. The combination claimed in claim 1 in which said electric alarm means comprises:
   a. a permanent magnet mounted on said security tool;
   b. an electrically activated alarm member;
   c. a normally closed magnetically responsive electric switch which opens when said permanent magnet is within a predetermined response distance therefrom;
   d. electrical connection means forming an alarm circuit which electrically connects said normally closed magnetically responsive electric switch, said electrically activated alarm member and the ignition switch so that said alarm circuit is energized only when the ignition switch is closed; and
   e. means mounting said normally closed magnetically responsive electric switch on said bracket member at a location such that when said security tool is in said storage position in said bracket member said permanent magnet is within said predetermined response distance from said normally closed magnetically responsive electric switch.

4. The combination claimed in claim 3 in which the permanent magnet is continuously connected to the security tool.

5. The combination claimed in claim 3 in which said normally closed magnetically responsive electric switch is a magnetically actuated reed switch.

6. The combination claimed in claim 5 in which said security tool comprises an elongated member having a first end and the permanent magnet is mounted on said first end.

* * * * *